April 27, 1965    E. W. FUERST    3,180,252
APPARATUS FOR FORMING INDICIA ON ARTICLES
Filed June 12, 1962    5 Sheets-Sheet 1
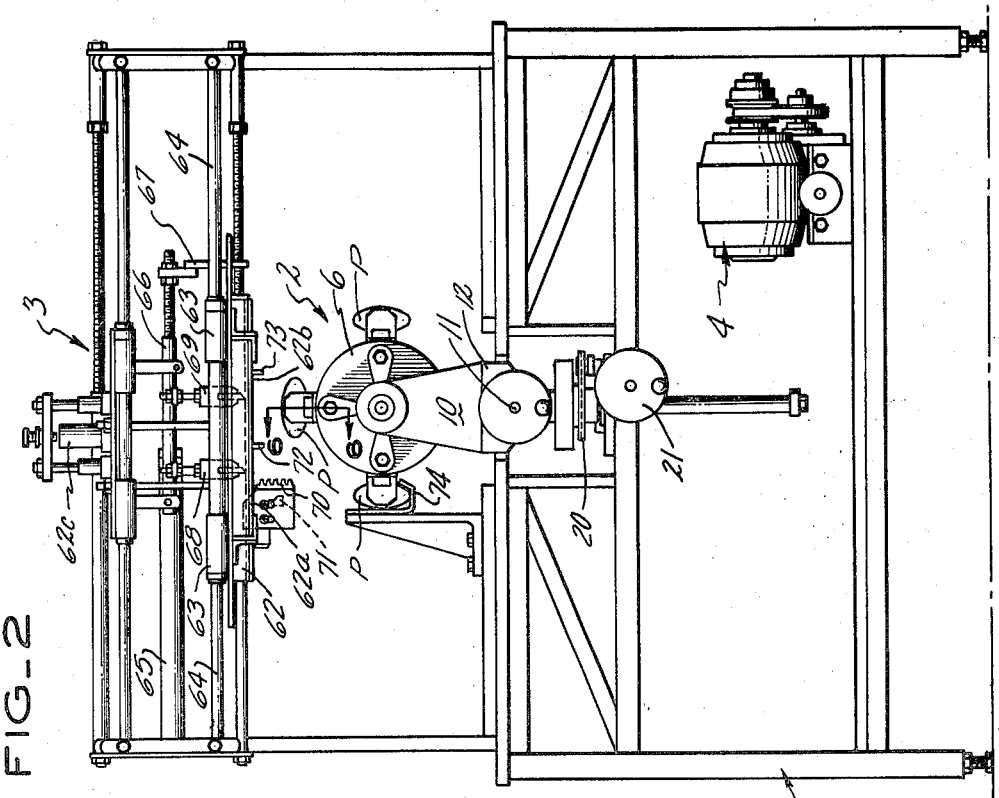
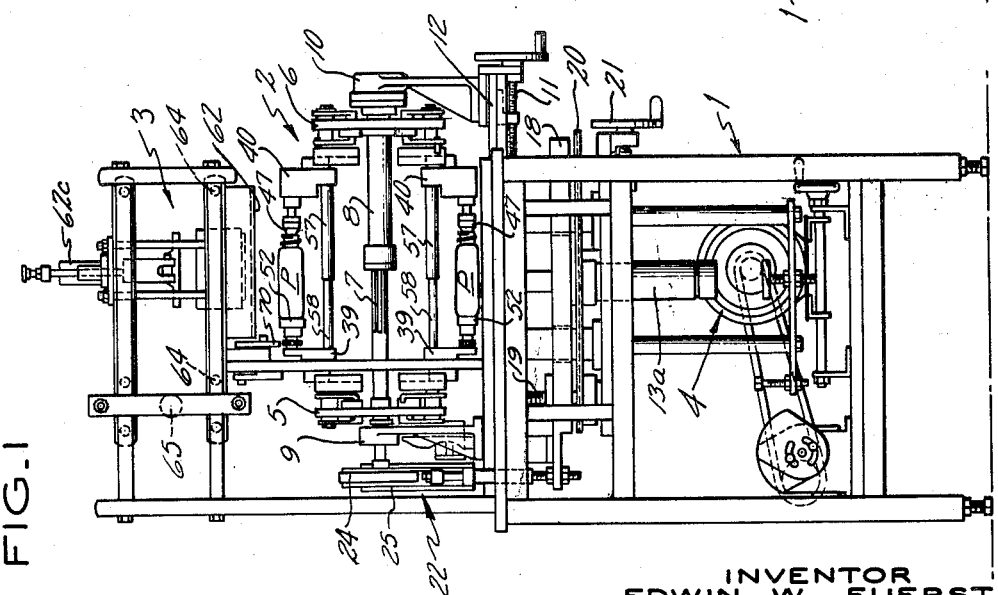
INVENTOR
EDWIN W. FUERST
BY Burns, Doane, Benedict, Swecker, & Mathis
ATTORNEYS April 27, 1965 E. W. FUERST 3,180,252
APPARATUS FOR FORMING INDICIA ON ARTICLES
Filed June 12, 1962 5 Sheets-Sheet 2
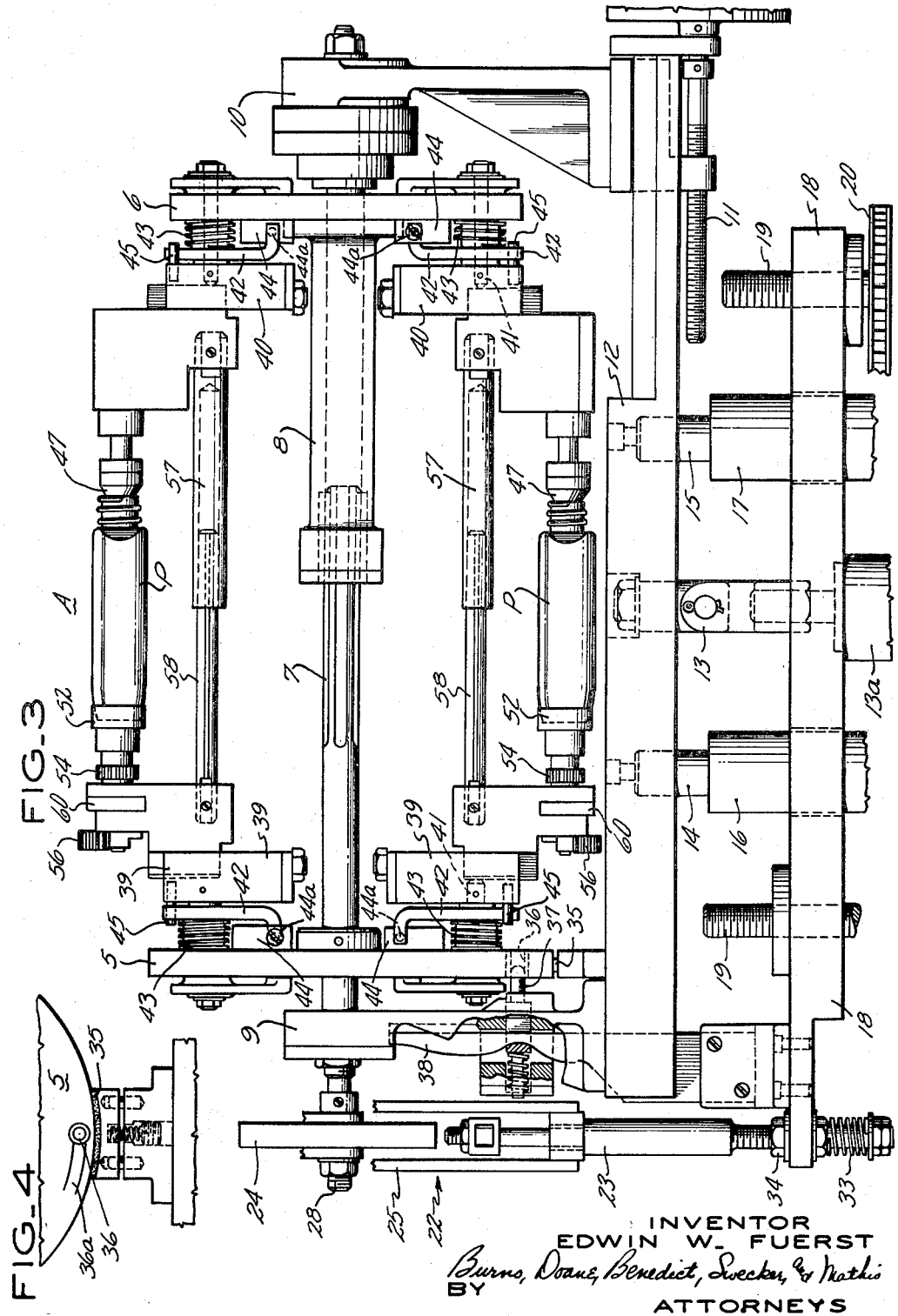
INVENTOR
EDWIN W. FUERST
BY Burns, Doane, Benedict, Swecker, & Mathis
ATTORNEYS April 27, 1965    E. W. FUERST    3,180,252
APPARATUS FOR FORMING INDICIA ON ARTICLES
Filed June 12, 1962    5 Sheets-Sheet 3

INVENTOR
EDWIN W. FUERST
BY Burns, Doane, Benedict, Swecker, & Mathis
ATTORNEYS

April 27, 1965 E. W. FUERST 3,180,252
APPARATUS FOR FORMING INDICIA ON ARTICLES
Filed June 12, 1962 5 Sheets-Sheet 4

INVENTOR
EDWIN W. FUERST
BY
ATTORNEYS

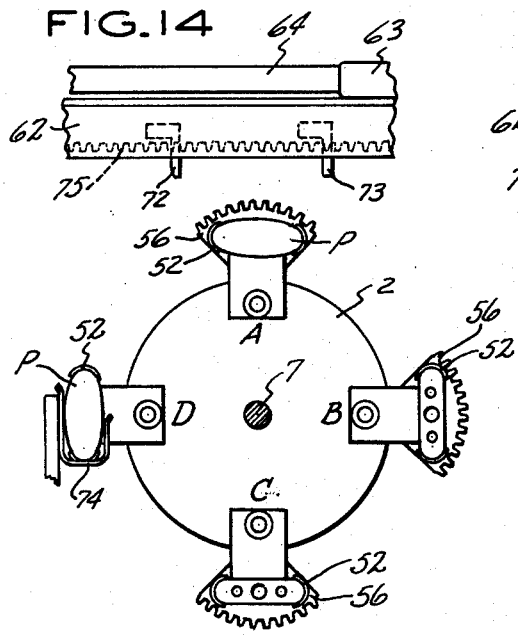
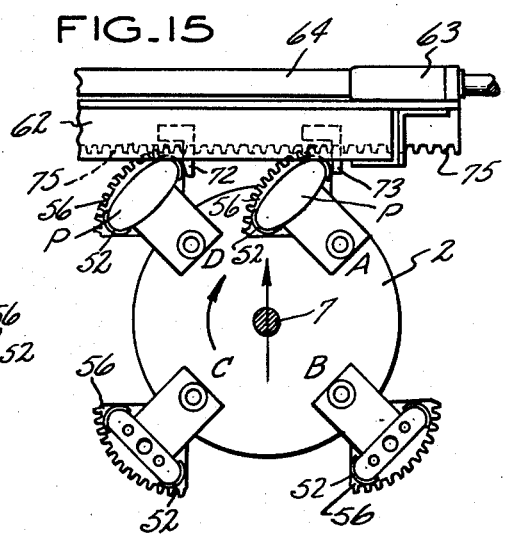
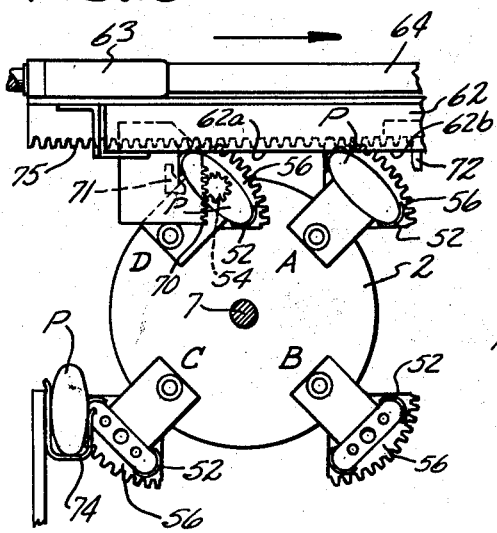
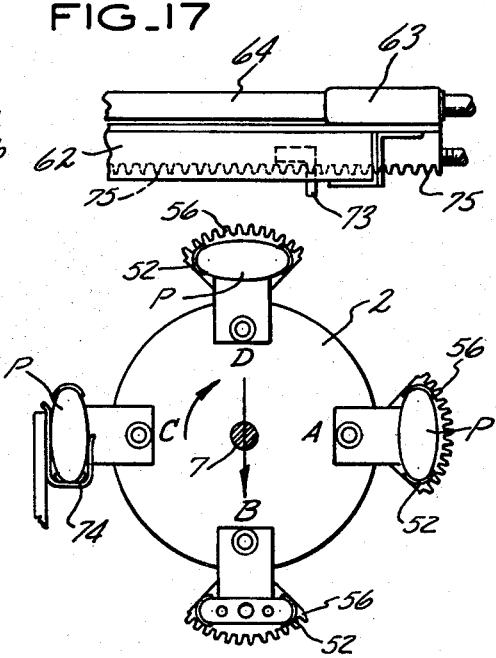

United States Patent Office    3,180,252
Patented Apr. 27, 1965

3,180,252
APPARATUS FOR FORMING INDICIA
ON ARTICLES
Edwin W. Fuerst, Hartford, Conn., assignor, by mesne assignments, to Monsanto Company, a corporation of Delaware
Filed June 12, 1962, Ser. No. 201,889
13 Claims. (Cl. 101—40)

This invention relates to a method and apparatus for forming indicia on articles. In particular, it involves a technique for printing both sides of oval or arcuate sided plastic bottles.

With the advent of the plastic container art, it has become commercially feasible to produce containers having non-circular, cross sectional configurations. Many such containers have oval, arcuate, or nearly arcuate peripheral portions. However, with the presently available commercial printing apparatus, it has been difficult or altogether impossible to print or otherwise form indicia on the non-cylindrical bottle portions.

It is an object of this invention to provide a method and apparatus by means of which non-cylindrical articles, and in particular oval, arcuate, or nearly arcuate sided articles, may be expeditiously and accurately printed or otherwise provided with indicia.

It is a particular object of the invention to provide a printing method and apparatus whereby silk screen, printing mechanisms may be employed to print arcuate article sides.

It is a further object of this invention to provide such a method and apparatus which economizes on the time and space required for indicia forming operations.

It is an additional object of the invention to provide such a method and apparatus which will enable the simultaneous forming of indicia on multiple articles.

A still further object of the invention is to provide such a method and apparatus which may be readily accommodated to the size requirements of a wide variation of articles.

It is a final object of the invention to provide an apparatus which is characterized by a structural simplicity, and ease, reliability and economy in operation.

To accomplish the foregoing objectives there is envisioned a technique for forming indicia on articles wherein one peripheral portion of an article is brought into position to have indicia formed thereon. Following the forming of indicia on the one peripheral portion, this peripheral portion is withdrawn from the indicia forming position. After the initiation of this withdrawal, the position of the article is changed and another peripheral portion of the article is then brought into position to have indicia formed thereon.

A further facet of the invention resides in the indicia forming technique. In this technique the article is mounted so that it may be arcuately moved with an arcuate, peripheral portion of the article following an arcuate path. This path will have a radius substantially equal to the radius of curvature of the arcuate periphery of the article. The article, so mounted, may be moved through its arcuate path to bring its arcuate periphery into tangential, indicia-forming engagement with indicia-forming means.

An additional facet of the invention involves an arrangement whereby the position of the article is changed in response to the withdrawal of the article from indicia forming means. Another facet of the invention entails a unique combination of an article transporting and supporting means and an indicia forming means which enables the simultaneous forming of indicia on two articles. Also involved in the invention is a unique combination of a horizontally reciprocating, silk screen, printing mechanism, and a horizontally rotating, article transporting and supporting turret.

Several structural features facilitate the accomplishing of the objects of this invention. Included in these features is an article supporting mechanism comprising pivoted arms for swinging articles through an arcuate path to effect tangential contact between the articles and a printing surface. A novel, resilient, arm-biasing structure is also provided. The article transporting and supporting turret is characterized by a variety of particularly effective adjusting mechanisms which enable the turret to be accommodated to different sized articles. While a variety of drive mechanisms could be employed to operate the turret, there is immediately envisioned a particularly advantageous, intermittent drive mechanism.

In describing the invention, reference will be made to a preferred embodiment, the structure and operation of which are illustrated in the accompanying drawings. In the drawings:

FIGURE 1 is an end elevational view of a silk screen, printing apparatus embodying features of this invention;

FIGURE 2 is a side elevational view of the printing apparatus illustrated in FIGURE 1;

FIGURE 3 is an enlarged, end elevational view of the turret portion of the apparatus illustrated in FIGURE 1;

FIGURE 4 is a fragmentary, end elevational view of a drag, or friction mechanism employed in conjunction with the turret illustrated in FIGURE 3;

FIGURES 10 through 17 are schematic views illustrating the sequential steps of operation of the apparatus.

Figure 5:
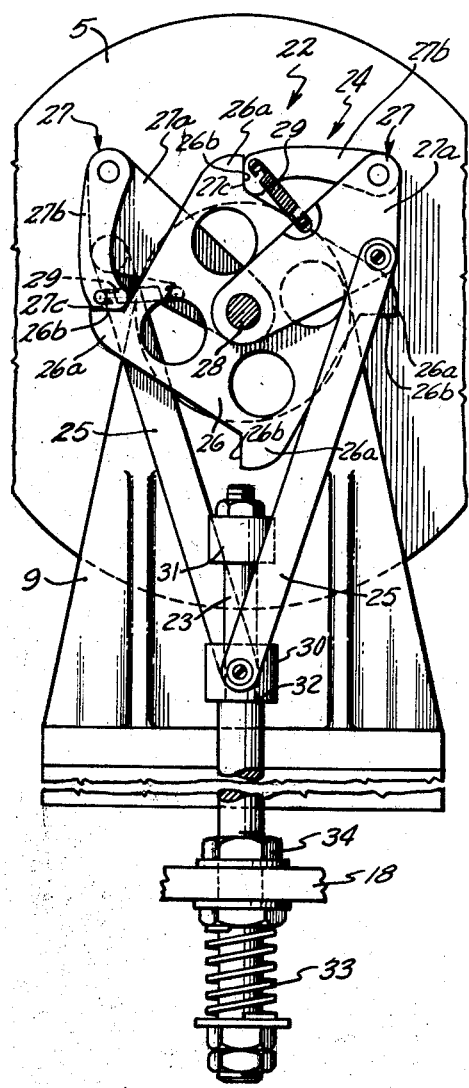
FIGURE 5 is a side elevational view of an intermittent drive mechanism employed to intermittently rotate the turret mechanism illustrated in FIGURE 3.

As shown in FIGURES 1 and 2, the illustrated printing mechanism comprises a frame 1, base means including an article supporting and transporting turret mechanism 2, and a silk screen, printing mechanism 3. Also illustrated is a motor driven control mechanism 4 for actuating, in controlled and predetermined sequence, the various operating components of the apparatus. The overall structure of mechanism 4, being conventional and an understanding of its characteristics not being necessary for an understanding of this invention, a detailed illustration of mechanism 4 is not provided.

The turret mechanism 2 is illustrated in detail in FIGURE 3. The mechanism includes two opposed turret sections, 5 and 6, which are spaced apart on the axis of rotation of the turret. The turret sections 5 and 6 are interconnected by splined members 7 and 8. Member 7 is rigidly secured to turret section 5, while member 8 is rigidly secured to turret section 6. Members 7 and 8, through their splined interconnection, are joined for unitary rotary movement, but are capable of axial convergence and separation. A shaft portion extends from turret section 5 and is journaled in upstanding support 9. Another shaft section extends from turret section 6 and is journaled in upstanding support 10. Support 10 is mounted for axial movement relative to turret 2. A threaded and hand wheel operated rod 11 is provided for effecting such axial movement so as to converge or separate the members 7 and 8 and their respectively turret sections 5 and 6. Such adjustability enables the turret 2 to be accommodated to articles of different lengths.

Supports 9 and 10 are mounted, as illustrated, on a platform 12. Platform 12 is supported for vertical, elevating and lowering movement on an hydraulic actuated mechanism including rods 13, 14 and 15. Rod 13 may extend from hydraulic cylinder 13a while rods 14 and 15 may slide respectively through guides 16 and 17 to stabilize platform 12 during its elevating and lowering movements.

The hydraulic elevating mechanism associated with the platform 12 is carried by subplatform 18. Subplatform 18 is supported on adjusting means, including threaded post 19. Post 19, which threadably engages subplatform 18, may be rotated by a drive chain 20 operated by a handle 21, as illustrated in FIGURES 1 and 2. Such rotation, of course, is effective to raise and lower subplatform 18, platform 12 and turret mechanism 2.

An intermittent drive mechanism 22 is employed to intermittently rotate turret 2. As illustrated in FIGURE 5, this mechanism includes a stationary operating rod 23, affixed to normally stationary subplatform 18, a ratchet and pawl mechanism 24 mounted on vertically movable turret 2, and pawl operating links 25, interconnecting the ratchet and pawl mechanism 24 and the operating rod 23.

As shown in FIGURE 5, the ratchet and pawl mechanism includes a ratchet wheel 26 mounted for unitary rotary movement with the turret 2. Ratchet wheel 26 is provided with four, outwardly projecting cams 26a, each of which provides a radially extending abutment face 26b. A pair of link assemblies 27 are provided which function as pawl means. Each such assembly includes a first link 27a pivotally attached at one end to a shaft portion 28, extending from turret 2. A second link 27b, included in the assembly, is pivotally attached at one end to first link 27a. The other end of link 27b is in engagement with the periphery of ratchet wheel 26 and provides an abutment face 27c for engaging the abutment face 26b of ratchet wheel 26. A spring 29 interconnects links 27a and 27b so as to hold link 27b in engagement with the periphery of ratchet wheel 26.

Each of the two operating links 25 extends from an outer end portion of a link 27a to a slide 30. Slide 30 is slideably mounted upon operating rod 23. Each operating link 25 is pivotally secured to its respectively associated link 27a and to the slide 30.

Slide 30 is free to undergo sliding movement on operating rod 23 to a limited degree as determined by abutments 31 and 32. Operating rod 23 is provided with a resilient cushioning mechanism comprising a spring 33 which tends to urge rod 23 downwardly against the restraint afforded by an abutment 34 engaging the top of platform 18.

The links 27a are inclined oppositely with respect to the direction of turret reciprocation, as illustrated in FIGURE 5. With the drive mechanism disposed in the position illustrated in FIGURE 5, the abutment faces 27c of links 27b engage abutment faces 26b of successive or adjacent cams 26a.

The structure of the intermittent drive mechanism 22 enables the platform 12 to be raised relative to subplatform 18 so as to cause the turret 2 to undergo intermittent, rotary advancement during the terminal portion of the raising of platform 12 and the terminal portion of the lowering of this platform. During the raising of platform 12, slide 30 will move freely until it engages abutment 31. Until this point no rotary movement of turret 2 will occur. When slide 30 is restrained by abutment 31, the abutment face 27c of the left hand link 27b illustrated in FIGURE 5 will tend to move its respectively engaged, cam abutment face 26b in a counterclockwise direction. This movement will of course effect clockwise rotation of the turret when viewing it from the right in FIGURE 1, or as illustrated in FIGURE 2. Continued upward movement of turret 2 will carry shaft portion 28 upwardly so as to move both links 27a generally downwardly but in opposite directions of rotation. The upward movement of turret 2, after engagement of slide 32 with abutment 31, is of such an extent that the ratchet 26 is capable of being advanced through a 45° or somewhat greater increment by engagement of the leftmost link 27b with a projecting cam 26a. As a result of this advancement, the rightward link 27b is moved clockwise, as shown in FIGURE 5, while the ratchet wheel 26 is moved counterclockwise. This opposite movement results in the link 27b of the rightward link assembly 27 being moved into abutting engagement with what was initially the rightward projecting cam 26a illustrated in FIGURE 5.

When platform 12 is moved down so as to carry turret 2 down with it, the slide 30 is moved downwardly away from abutment 31. Until the slide 30 engages abutment 32, the ratchet and pawl mechanism is inoperative such that the turret 2 undergoes no rotary movement. When slide 30 engages abutment 32, rotary advancing movement of the turret is again effected, in a manner analogous to that heretofore described. In this instance, however, the rightward link 27b effects the rotary advancement of ratchet wheel 26 through an additional increment.

A drag mechanism is provided for restraining and controlling the movement of turret 2. This mechanism includes a spring-biased friction pad 35 which relatively lightly engages the periphery of turret section 5, as illustrated in FIGURE 4.

To insure the proper registration of the turret 2 during the printing operation, a detent mechanism is provided for locking the turret in registered positions. This registration structure includes apertures 36, as illustrated in FIGURES 3 and 4, which are spaced about the periphery of turret section 5 at 45° increments.

A horizontally reciprocating, spring-biased detent 37 is mounted in upstanding support 9. Detent 37, as illustrated in FIGURE 3, includes a portion engaged by a stationary cam 38, which is secured to subplatform 18. Cam 38 is configured so that the detent 37, as it moves vertically with platform 12, may be allowed to move laterally and enter aperture 36 so as to brake and register turret 2. The cam 38 is configured to effect engagement of detent 37 with apertures 36 at the end of each 45° advancement as effected by the ratchet and pawl mechanism 22. Cam 38 may allow detent 37 to engage turret section 5 prior to the completion of this 45° increment and move into aperture 36 through inclined approach grooves 36a which slope downwardly toward these apertures.

The coil spring 33, which yieldably urges rod 23 downwardly and provides a shock absorbing action, also allows the intermittent drive mechanism 22 to function with a degree of independence with respect to the movement of turret 2. With this arrangement, the turret may be braked by engagement of the detent 37 with an aperture 36 while reciprocating movement of the turret 2 is in progress. With the turret locked in position by engagement of the detent 37 with an aperture 36, the intermittent drive mechanism is prevented from operating even though the turret is still moving upwardly. Because of the yieldability of operating rod 23, as provided for by coil spring 33, the mechanism itself is rendered ineffective so as to prevent jamming and allow the turret to continue its upward movement.

The article supporting means associated with the turret 2 includes a plurality of arm means, each comprising a pair of spaced arm units. As illustrated in FIGURE 3, one arm 39 of each pair is attached to a turret section 5, while the other arm 40 of each pair is attached at a corresponding location to to other turret section 6.

Figure 9:
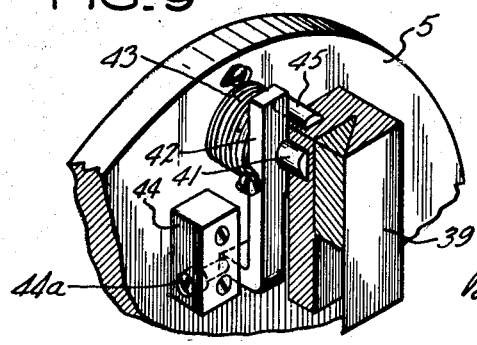
FIGURE 9 is a partially sectioned view illustrating the mode of attachment of the article supporting means to the turret.

Associated with each arm 39 and 40 is a unique mechanism for resiliently and yieldably securing the arm means in a positively defined, radially extending position. The portion of the structure for effecting this support is illustrated in FIGURE 9. The arm 39 is mounted for swiveling movement relative to turret section 5 through means of connecting pin 41. Stop means comprising a link 42 is mounted on pin 41 for swiveling movement relative to arm 39 and turret section 5. A coil spring 43 is provided which urges link 42 to rotate and engage an abutment 44 mounted on turret section 5. Abutment 44 provides a stop to limit the movement of link 42 through engagement with the lower end of this link. The stop may comprise an adjustable set screw 44a which engages link 42. A pin or abutment 45 which projects from arm 39 engages the upper end of link 42 on the side of link 42 opposite to that engaging abutment 44.

As illustrated in FIGURE 3, a structure similar to that shown in FIGURE 9 is associated with arm 40. This structure, however, is disposed such that the pin extending from the arm 40 engages its respective link on the side opposite to the link side engaged by the corresponding projecting pin associated with arm 39. Similarly, the lower ends of that link 42 associated with the arms 39 and 40 are arranged to be resiliently urged into engagement with opposite sides of their respectively associated abutments 44.

Referring to FIGURE 3 and FIGURE 9, it will be seen that the link 42 associated with arm 39 tends to prevent one direction of rotational movement of arm 39, away from a radially extending position defined by engagement of this link 42 with an abutment 44. The link 42 associated with arm 40 tends to prevent the opposite direction of rotational movement of arm 40, when viewing this arm in the same direction as shown in FIGURE 9. The link 42 associated with the arm 40 similarly tends to secure this arm in a radially extending position defined by its engagement with its respectively associated abutment 44. By manipulation of set screws 44a the normal extending position of the arms 39 and 40 may be adjusted to obtain a suitable positioning of an article with respect to the printing mechanism.

Figure 6:
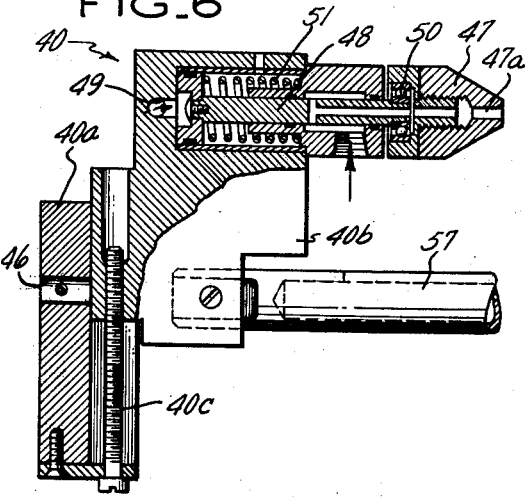
FIGURE 6 is a partially sectioned view of one portion of the article supporting means of this apparatus as viewed along the line 6—6 of FIGURE 2.

In FIGURE 6 there is shown a partially sectioned view of an arm 40 as viewed along the line 6—6 of FIGURE 2. Arm 40 includes an aperture 46 to receive mounting or connecting pin 41. Arm 40 includes section 40a and section 40b which are mounted for relative sliding movement. The relative position of components 40a and 40b may be adjusted and secured by threaded rod 40c. An article gripping plunger 47 is mounted on member 40b by means of an extensible piston rod 48. A cavity 49 to the left of piston rod 48, as viewed in FIGURE 6, communicates with a source of pressurized fluid so as to enable the rod 48 to be projected and thus extend the article engaging or gripping member 47. Member 47, it should be noted, is mounted for rotational movement relative to piston rod 48 by ball bearing means 50. A spring 51 is provided to return the piston rod 48 to its retracted position.

Figure 7:
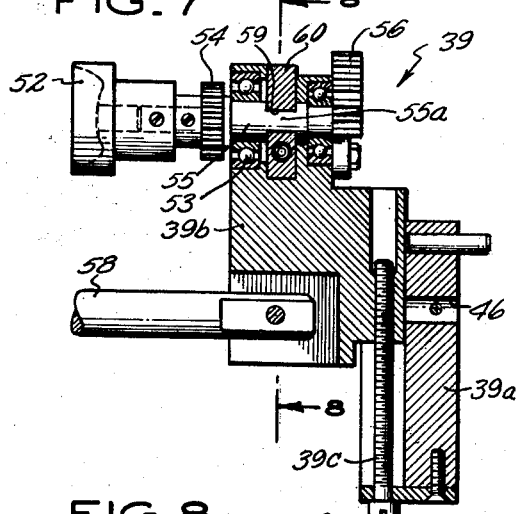
FIGURE 7 is a sectional view of another portion of the article supporting means of this apparatus, also viewed along the line 6—6 of FIGURE 2.

In FIGURE 7 there is illustrated a sectional view through an arm 39, as viewed along the line 6—6 of FIGURE 2. Each arm 39 includes a section 39a and a relatively slideable section 39b. A threaded rod 39c is provided for adjusting the position of these two components. An aperture 46 such as is included in component 40a is provided in component 39a for engaging a mounting pin 41 associated with arm 39.

An article gripping or engaging socket 52 is journaled in arm member 39b by bearing means 53. A pinion gear 54 is mounted on a shaft 55 which extends from bearing means 53 to support socket 52. An arcuate gear section 56 is also mounted on shaft 55, as illustrated.

Arms 39 and 40 are interconnected by an assembly including a tubular member 57 extending from arm member 40b and a rod member 58 which extends from arm member 39b for telescoping engagement with tubular member 57.

Figure 8:
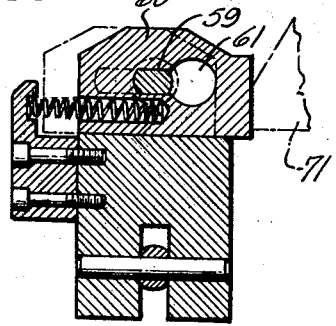
FIGURE 8 is a sectional view taken along the lines 8—8 of FIGURE 7 and illustrating a release mechanism associated with article position changing means.

As illustrated in FIGURE 8, means are provided on arm member 39b for selectively preventing or enabling the rotation of shaft 55. Shaft 55 includes a grooved or flattened portion 55a, normally received within a slot 59 of a spring-biased slide 60. When slide 60 is moved to the left, as shown in FIGURE 8, the portion 55a of shaft 55 is moved into an enlarged aperture 61 which will enable rotation of this shaft.

Through the interconnected tubular member 57 and rod member 58, arms 39 and 40 function as a unitary structure for supporting a generally oval article P between plunger 47 and socket 52, as illustrated in FIGURE 3. Tubular member 57 and rod 58, if desired, may be splined to prevent relative rotary movement of arms 39 and 40. Similarly, tubular members 57 and arm 58 may be disposed out of axial alignment with apertures 46 so as to prevent relative rotational movement of arms 39 and 40.

The resilient centering mechanisms associated with the arms 39 and 40 resiliently and yieldably secure these unitary arms in a positively defined, radially extending position. However, the arms are free to swivel about the connecting pins 41, so as to move the article P, supported between plunger 47 and gripper 52, through an arcuate path. Threaded rods 39c and 40c may be manipulated to adjust the relative positions of members 40a and 40b, as well as members 39a and 39b such that the radial distance between apertures 46 and the arcuate, uppermost periphery of the supported article P is substantially the same as the radius of curvature of this periphery. With this arrangement, a periphery of the article P will be moved through an arcuate path aligned with its arcuate outermost periphery. In other words, this means that the axis of curvature of this article periphery will substantially coincide with the pivot axis of arms 39 and 40, i.e. the center axis of aperture 46 and mounting pins 41.

During the printing of article P, the article is secured by the fluid biased plunger 47 pressing the article into socket 52. Where plastic or yieldable bottles are being printed, it may be desirable to support the bottle or article walls. In this event, an aperture 47a may be provided in the plunger arrangement through which pressurized gas may be introduced into the interior of a supported bottle to support the bottle periphery for a printing operation.

The silk screen, printing mechanism included in the apparatus is illustrated in FIGURES 1 and 2. This apparatus includes a silk screen frame 62 mounted for horizontal, reciprocating movement. Screen frame 62 is supported by sleeves 63 which are slideably mounted on horizontal rods 64. Through the operation of indicia forming means, actuating means comprising a piston and cylinder assembly 65, the frame 62 may be horizontally reciprocated through actuation of a piston rod 66 which is attached to the frame 62 through connecting member 67.

Printing frame 62 supports two, co-planar, silk screen, printing surfaces 62a and 62b, which are horizontally spaced as shown in FIGURE 2. A first, laterally adjustable, ink distributor 68 is associated with the first, silk screen, printing surface 62a while a second, laterally adjustable, ink distributor 69 is associated with the second, silk screen printing surface 62b. If desired, distributors 68 and 69 may be vertically moveable. When thus mounted, they may be retracted during the return or non-printing stroke of the screen. To effect article printing, the distributors may be depressed so as to depress the screens into engagement with article surfaces to be printed. A conventional, fluid actuated piston and cylinder structure 62c may be employed to effect this retraction and depression.

Extending downwardly from one end of the printing frame 62 is a vertically extending, geared rack 70. Printing frame 62 also supports a plurality of abutment means cooperable with various instrumentalities on turret 2 in a manner to be hereinafter described. Such abutment means include abutments 71, 72 and 73, as illustrated in FIGURE 2.

Having described the over-all apparatus and the mode of operation of its individual components, the integrated operation of the printing machine will now be described with reference to FIGURES 10 through 17. These figures schematically illustrate the vertically moveable and rotatable turret 2 and its operating relationship with respect to the horizontally, reciprocating, printing frame 62.

Before the printing operation of the machine is initiated, the various components are adjusted to accommodate to the dimensions of an article to be printed. Threaded rods 39c and 40c are operated to insure that an article to be printed will be moved through an arcuate path such that the outermost arcuate periphery of the article will move through a corresponding, arcuate path. Set screws 44a may be adjusted as required to regulate the position at which articles are supported by the arms. If necessary, subplatform 18 may be adjusted to insure that the arcuate movement path of articles supported on the turret 2 will be substantially tangential with the printing surfaces of the printing frame 62. Threaded rod 11 will be manipulated to obtain a spacing of plungers 47 and sockets 52 commensurate with the length of the articles to be printed.

Figure 10:
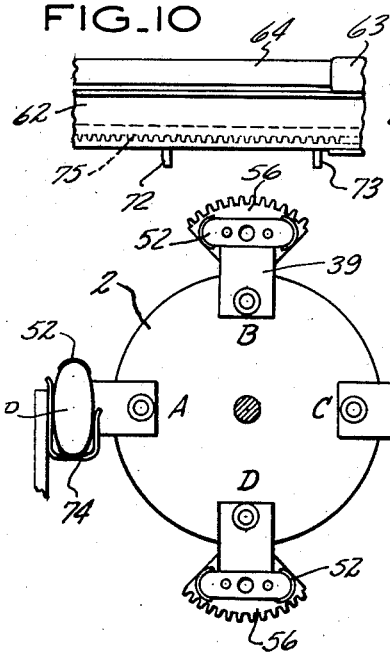

With the machine having been appropriately adjusted, article printing may be initiated. As shown in FIGURE 10, a cycle is initiated with the turret withdrawn from the printing frame 62 and the printing frame moved to its leftmost position. In this position, the arm means at station A is aligned with an article supplying station 74 to receive an article to be printed on both sides. With the frame 62 stationary, the platform 12 is elevated so as to raise the turret 2 and operate the intermittent feed mechanism 22. During the initial part of the upward movement of turret 2, no rotation of the turret takes place. During the terminal portion of the upward movement of turret 2 the turret is rotated through a 45° increment through the actuation of intermittent feed mechanism 22. Through operation of detent 37, rotary turret movement is interrupted shortly before the end of the upward turret movement so as to effect linear engagement between the printing mechanism and the article supporting arms. This linear, rotary, then linear movement brings the turret into the position illustrated in FIGURE 11. In this position the arm means at station A extends radially outward with the gear segment 56 engaging a geared rack 75 extending horizontally along the frame 62. The arm means at station B, as illustrated, is also positioned with its gear segment in engagement with rack 75. Proper meshing of the gear segments 56 with the geared rack 75 is insured by the engagement of the abutments 72 and 73 with abutment portions of the arm means at stations A and B, and by the last, upward and linear movement of turret 2.

Figure 11:
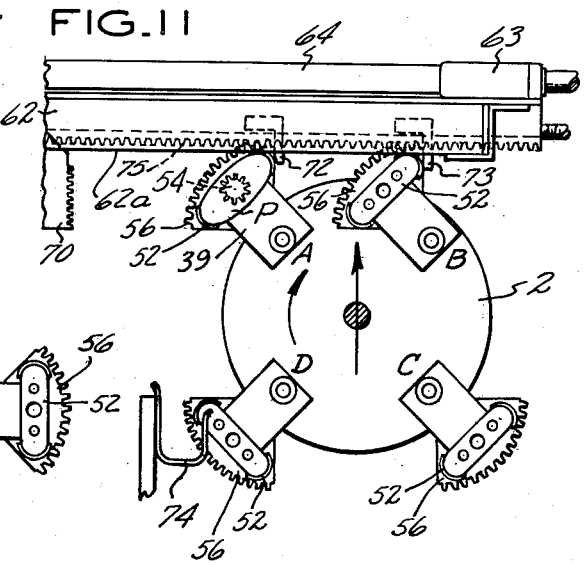
Figure 12:
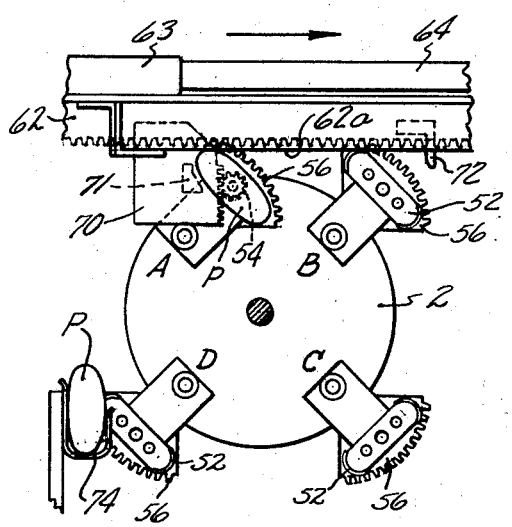

With the apparatus positioned as illustrated in FIGURE 11, the frame 62 is moved to the right to effect the printing of the outermost peripheral portion of the article supported by the arm means at station A. This movement, through inter-engagement of the geared segment 56 and the geared rack 75, rotates the arm means at station A through a 90° arc. During this rotation, the outer periphery of the article is moved tangentially with the printing surface 62a to effect its printing through conventional silk screen technique.

At the end of the printing by printing surface 62a, the pinion 54 on the arm 39 at station A is brought into engagement with the vertically extending, geared rack 70 carried by the printing frame 62. Prior to the engagement of pinion gear 54 with the toothed rack 70, the abutment 71 engages the slide 60 so as to free the pinion gear 54 for rotation. The platform 12 is then moved downwardly to separate the turret 2 and silk screen frame 62. During this downward movement, and in response thereto, the pinion 54 is rotated as a result of its arm means biased, engagement with geared rack 70 so as to rotate the article at station A through a 180° arc. This rotation is effected while the turret is undergoing only vertical movement during its downward travel. After the rotation of pinion 54 has been concluded, the terminal portion of the downward travel of the turret 2 will result in the turret being rotated through a 45° arc by the intermittent drive mechanism 22 so as to bring the apparatus components into the position illustrated in FIGURE 13. In this position the pinion 54 has separated from the rack 70 while the arm means at station A has resumed a radially extending position as a result of its associated, resilient biasing means.

Figure 13:
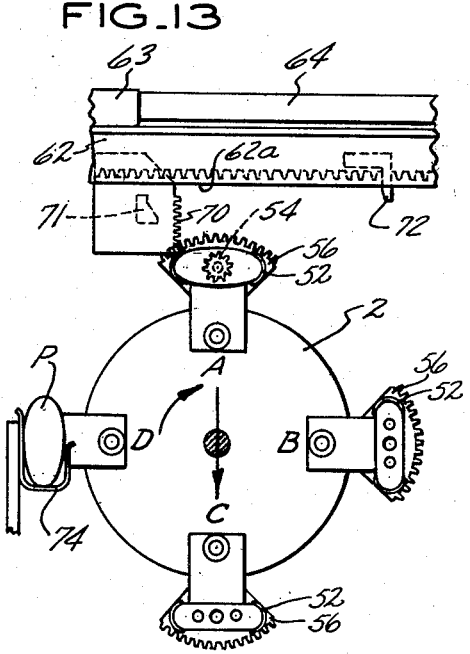

As shown in FIGURE 13, the arm means at station D is in position to receive a second article to be printed. While the turret is receiving this second article, the screen frame 62 is returned to the left so that the components will assume the position illustrated in FIGURE 14.

With the components positioned as illustrated in FIGURE 14, upward movement of the turret 2 may again be initiated. During the initial part of this upward movement, no turret rotation will take place. During this purely linear movement, the arm means A will be brought into position adjacent the left side of abutment 73. During the terminal portion of the upward movement of turret 2, when it undergoes a 45° rotary movement, the the arm means at station A, through engagement with the left side of abutment 73, will be rotated to the left through a 90° increment to assume the canted position shown in FIGURE 15. During this phase of the operation, the arm means shown at station D will assume the radial position formerly occupied by the arm means at station A during the previous printing operation. The final upward and linear movement of turret 2 will effect the engagement of the gear segments of the arm means at stations A and D with the rack 75.

In FIGURE 16 the components are shown in the position assumed at the conclusion of the movement of the frame 62 to the right. This rightward movement of the frame 62 effects the simultaneous printing of articles carried by the arm means at both stations D and A. The article carried by the arm means at station A is printed on the opposite side to that previously printed by engagement with silk screen printing surface 62b. During this printing, the article carried by station D is printed through engagement with the silk screen, printing surface 62a.

In FIGURE 17 the components are illustrated after the turret 2 has been fully withdrawn and the printing frame 62 returned to the left. With the apparatus in this position, the turret may again be raised to effect the printing of the other side of the article carried at station D and the simultaneous printing of a first side of an article carried at station C.

It will be understood that conventional control apparatus may be employed in effecting the sequential operation of apparatus components as heretofore described.

The advantages which may be imputed to the method and apparatus of this invention are several in number. Included among them, and of foremost consequence, is the provision of a technique which enables the printing of non-cylindrical articles such as containers having oval or arcuate sided walls. Through the unique, disclosed combination of a turret, intermittent drive, and reciprocating screen, the simultaneous printing of two articles may be achieved. The novel cooperation of the separating turret and screen, as previously described, provides a positive and time and space saving technique for changing the position of a once printed article for subsequent printing on a different portion. Combined with this position changing mechanism, is a safety feature in the form of a release mechanism to prevent inadvertent position changing of the article during portions of the operation when position changes might adversely affect article alignment.

The disclosed combination of an intermittent drive mechanism and a turret braking mechanism achieves the precise intermittent feed strokes necessary for positioning the turret. It achieves a unique, linear, rotary, then linear turret movement so as to properly align articles with printing surfaces and engage article supports with the printing mechanism. It avoids the necessity of providing precise correlation between the turret movement necessary to move articles to the printing unit and the necessary movement of the operating links of the intermittent drive mechanism.

Positive and accurate registration of the turret is achieved through the combination of intermittent feed mechanism, detent mechanism and drag mechanism. Accurate article registration is facilitated by the arm biasing structure of this invention which supports the arm means in yieldable but positively defined, radially extending positions.

Positive and rapid article engagement and disengagement is effected through the air operated plungers. By combining a gas supplying system with these plungers, proper support for yieldable article walls is achieved.

The structure described is particularly adapted for adjustments which accommodate the turret to the dimensions of particular articles to be printed. Such adjustments may be readily and accurately made with minimum effort. The overall compactness of the apparatus effects a material conservation of space and the general structural nature promotes speed and accuracy in the printing operation.

While the apparatus has been described with reference to a particular preferred embodiment, it will be at once apparent to those skilled in the art that departures may be made from the disclosed structure while remaining within the purview of this invention. For example, either the screen, or the turret, or both, could be moved to effect the vertical convergence and separation of these components. The bulk of the convergence could be effected by movement of the screen frame, or the turret, or both, while the final increment of convergence could be effected by slightly depressing the ink distributors so as to depress the screen. A drive mechanism other than that disclosed might be employed. Similarly, the exact disclosed mode of engagement of the components schematically illustrated in FIGURES 10 through 17 might be varied while effecting the same general operational steps. It is apparent that the disclosed multiple indicia forming means may be unitary, as illustrated, or comprise separate printing units. It is also possible that the article position changing feature of this invention, in a broad sense, could be employed with a single indicia forming unit for printing the same indicia on different article portions.

While the invention has been described with reference to a preferred embodiment, the overall scope is deemed to be defined in the appended claims.

I claim:
1. An apparatus for supporting articles in engagement with relatively moving indicia forming means so as to permit surface portions of said articles to move tangentially with said indicia forming means, said apparatus comprising:
   article transporting means;
   arm means;
   connecting means swivelly joining said arm means and said article transporting means;
   article engaging means on said arm means;
   and resilient means for yieldably biasing said arm means against either forward or rearward swivelling movement and yieldably holding said arm means in a positively defined position, said resilient means including;
      first link means mounted on said connecting means for swivel movement relative to said transporting means and said arm means,
      first abutment means on said transporting means engaging one end of said first link means to prevent rearward swivel movement thereof, first spring means urging said one end of said first link means against said first abutment means,
      second link means mounted on said connecting means for swivel movement relative to said transporting means and said arm means,
      second abutment means on said transporting means engaging one end of said second link means to prevent forward swivel movement thereof, second spring means urging said one end of said second link means against said second abutment means,
      and third and fourth abutment means carried by said arm means,
      said third abutment means being adapted to engage the end of said first link means opposite to the one end engaging said first abutment means and on the side of first link means opposite to that engaged by said first abutment means,
      and said fourth abutment means being adapted to engage the end of said second link means opposite to the one end engaging said second abutment means and on the side of said second link means opposite to that engaged by said second abutment means.

2. An apparatus for forming indicia on articles, said apparatus comprising:
   indicia forming means;
   means for actuating said indicia forming means to form indicia on articles;
   article transporting means;
   a plurality of arm means mounted on said article transporting means;
   a plurality of mutually spaced swivel mounting means, with each such swivel mounting means pivotally connecting an arm means to said article transporting means;
   means for imparting swivel movement to each of said arm means about the pivot axis of its respective swivel mounting means;
   article engaging means carried on each arm means and radially spaced, with respect to the pivot axis of the swivel mounting means of its respective arm means, from said swivel mounting means, and adapted to support articles for rotational movement relative to said arm means;
   each said article engaging means being radially spaced from the swivel mounting means of its respective arm means by such a distance as to support an article with the axis of curvature of an arcuate article portion to be printed substantially coinciding with the pivot axis of said swivel mounting means;
   said movement of each of said arm means about its respective swivel mounting means being adapted to move an article supported thereon through an arcuate path with said article portion to be printed and said indicia forming means moving together in tangential, indicia forming contact;
   means for relatively converging said article transporting means and said indicia forming means to bring said indicia forming means into engagement with one portion of an article and for separating said article transporting means and said indicia forming means; and
   means for rotating each article engaging means on its respective arm means so as to change the position at which said article engaging means supports said article in response to said separation of said article transporting means and said indicia forming means whereby said article transporting means and said indicia forming means may be reconverged along the same path as before converged to bring said indicia forming means into engagement with one portion of said article, said reconvergence being adapted to bring indicia forming means into engagement with another portion of said article, with at least one of said indicia forming means and article transporting means being moved in opposite directions between limits of said path to effect said separation and convergence.

3. An apparatus for forming indicia on articles, said apparatus comprising:
indicia forming means;
means for actuating said indicia forming means to form indicia on articles;
article transporting means;
a plurality of arm means mounted on said article transporting means;
a plurality of mutually spaced swivel mounting means with each such swivel mounting means pivotally connecting an arm means to said article transporting means;
means for imparting swivel movement to each of said arm means about the pivot axis of its respective swivel mounting means;
article engaging means carried on each arm means and radially spaced, with respect to the pivot axis at the swivel mounting means of its respective arm means, from said swivel mounting means, and adapted to support articles for rotational movement relative to said arm means;
each said article engaging means being radially spaced from the swivel mounting means of its respective arm means by such a distance as to support an article with the axis of curvature of an arcuate article portion to be printed substantially coinciding with the pivot axis of said swivel mounting means;
said movement of each of said arm means about its respective swivel mounting means being adapted to move an article supported thereon through an arcuate path with said article portion to be printed and said indicia forming means moving together in tangential, indicia forming contact;
means for converging said transporting means and said indicia forming means to bring said indicia forming means into engagement with one portion of a first article and another portion of a second article and for separating said transporting means and said indicia forming means; and
means for rotating each article engaging means on its respective arm means so as to change the position at which said article engaging means supports said first article in response to said separation of said transporting means and said indicia forming means whereby said transporting means and said indicia forming means may be reconverged along the same path as before converged to bring said indicia forming means into engagement with one portion of said first article, said reconvergence being adapted to bring said indicia forming means into engagement with another portion of said first article and one portion of a third article with at least one of said indicia forming means and article transporting means being moved in opposite directions between limits of said path to effect said separation and convergence.

4. An apparatus for supporting articles in engagement with relatively moving indicia forming means so as to permit surface portions of said articles to move tangentially with said indicia forming means, said apparatus comprising:
article transporting means;
arm means;
swivel mounting means joining said arm means and said article transporting means;
article engaging means on said arm means radially spaced, with respect to the pivot axis of said swivel mounting means, from said swivel mounting means; and means for yieldably biasing said arm means against either forward or rearward swivelling movement and tending to restore said arm means to a positively defined position when said arm means is displaced therefrom, said means including first, pivotable and resiliently biased stop means engaging said arm means to resist pivotable movement thereof in one direction, and
second, pivotable and resiliently biased stop means engaging said arm means to resist pivotable movement thereof in a direction opposite to said one direction.

5. An apparatus for supporting and transporting articles in relation to a printing station, said apparatus comprising:
turret means;
drive means for rotating said turret means;
article supporting means carried by said turret means;
said turret means including a first and a second turret section with said sections being spaced on the axis of turret rotation;
axially separable but rotatably unitary means joining said first and second turret sections;
means for selectively converging or separating said first and second turret sections;
said article supporting means comprising a plurality of pairs of arms, each having article engaging means;
a plurality of mutually spaced swivel mounting means, with each such swivel mounting means pivotally connecting an arm to a turret section at a point radially spaced from its respective article engaging means, with the arms of each pair being disposed respectively on said first and second turret sections and having aligned pivot axes;
means joining the arms of each arm pair for unitary, swivelling movement;
and means for extending or contracting the radial distance at which said article engaging means are spaced from said swivel mounting means to cause the axis of curvature of a peripheral portion of an article carried by the article engaging means of a pair of arms to substantially coincide with the pivot axes of the swivel mounting means of said arms.

6. An apparatus for forming indicia on peripheral portions of articles, each of which portions has an axis of curvature, said apparatus comprising:
indicia forming means;
means for actuating said indicia forming means to form indicia on articles;
a plurality of arm means;
base means;
a plurality of mutually spaced swivel mounting means with each such swivel mounting means pivotally mounting an arm means on said base means;
article engaging means mounted on each arm means and adapted to support articles for movement through an arcuate path;
each article engaging means being radially spaced, with respect to the pivot axis of its respective swivel mounting means, from said swivel mounting means such a distance that the axis of curvature of a peripheral portion of an article to receive indicia substantially coincides with the pivot axes of said swivel mounting means; and
means for jointly reciprocating said indicia forming means and moving at least one of said arm means about its respective swivel mounting means to cause said indicia forming means and the peripheral portion of an article carried by said one arm means to move together at the same speed in tangential, indicia forming contact while said article is moved through an arcuate path.

7. An apparatus as defined in claim 6 wherein each article engaging means is adapted to support an article for rotational movement relative to its respective arm means.

8. An apparatus for forming printed indicia on articles, said apparatus comprising:
indicia forming means including first, screen printing means and second, screen printing means;

mounting means supporting said first and second screen printing means for unitary, horizontal reciprocating movement;

said first and second screen printing means having downwardly facing, coplanar, and horizontally spaced, screen printing surfaces;

means for jointly reciprocating said first and second screen printing means on said mounting means;

turret means for transporting articles to be printed, said turret means having a horizontal axis of rotation extending transversely of the direction of reciprocating, screen movement;

means for rotating said turret means about its horizontal axis of rotation;

a plurality of arm means mounted on said turret means;

a plurality of mutually spaced swivel mounting means, with each swivel mounting means pivotally connecting an arm means to said turret means;

means for imparting swivel movement to each of said arm means about the pivot axis of its respective swivel mounting means;

article engaging means carried on each arm means and radially spaced, with respect to the pivot axis of the swivel mounting means of its respective arm means, from said swivel mounting means and adapted to support articles for rotational movement relative to said arm means;

each said article engaging means being radially spaced from the swivel mounting means of its respective arm means by such a distance as to support an article with the axis of curvature of an arcuate article portion to be printed substantially coinciding with the pivot axis of said swivel mounting means;

said movement of each of said arm means about its respective swivel mounting means being adapted to move an article supported thereon through an arcuate path with said article portion to be printed and one of said screen printing means moving together in tangential, indicia forming contact;

means for vertically converging said turret means and said indicia forming means to bring said first, screen printing means into engagement with one portion of a first article and said second, screen printing means into engagement with another portion of a second article and for vertically separating said turret means and said indicia forming means; and means for rotating each article engaging means on its respective arm means so as to change the position at which an article engaging means supports said first article in response to said vertical separation of said turret means and said indicia forming means whereby said turret means and said indicia forming means may be vertically re-converged to bring said second, screen printing means into engagement with another portion of said first article and said first, screen printing means into engagement with one portion of a third article.

9. An apparatus as described in claim 8 including:

a plurality of arm means which are uniformly spaced about said turret means;

resilient means for yieldably biasing each of said arm means against either forward or rearward swivelling movement and yieldably holding each of said arm means in a radially extending position;

vertically extending, toothed rack means extending downwardly from said first, screen printing means;

pinion gear means carried by each of said arm means, said pinion gear means, when rotated, being adapted to rotate the article engaging means carried by its respective arm means;

said pinion gear means being adapted to be moved into engagement with said vertically extending toothed rack means at the conclusion of the printing of articles by said first screen printing means such that when said turret means is vertically separated from said indicia forming means, said pinion gear means is rotated to rotate articles supported by said article engaging means;

abutment means extending downwardly from said second, screen printing means;

said means for imparting swivel movement to each of said arm means comprising horizontally extending toothed rack means carried by said indicia forming means and arcuate gear means carried on each of said arm means;

said means for rotating said turret means being adapted to partially rotate said turret means during the separation of said turret means and said indicia forming means and to partially rotate said turret means during the convergence of said turret means and said indicia forming means whereby, said turret means and said indicia forming means may be converged to bring said first article carried by one of said arm means into engagement with the printing surface of said first, screen printing means, said first, screen means may be moved horizontally to print said one portion of said first article, and through engagement of said horizontally extending toothed rack means with the arcuate gear means of said one arm means, pivot said one arm means to move said one portion of said article tangentially with the printing surface of said first, screen printing means;

said pinion gear means of said one arm means may be brought into engagement with said vertically extending toothed rack means;

said turret means and said indicia forming means may be separated with said first article being rotated as a result of rotation of said pinion gear means induced by engagement of said pinion gear means with said vertically extending rack means;

said turret means may be partially rotated during the separation of said turret means and said indicia forming means to free said pinion gear means from said vertically extending toothed rack means;

said turret means and said indicia forming means may be re-converged to bring said one of said arm means into engagement with said abutment means extending from said second, screen printing means; and said turret means may be rotated during the convergence of said turret means and indicia forming means to cause said one arm means engaged by said abutment means to be pivoted so as to align said one article supported on the article engaging means thereof in position for the initiation of printing on another article portion.

10. An apparatus as described in claim 8 including:

a plurality of arm means which are uniformly spaced about said turret means; and resilient means for yieldably biasing said arm means against either forward or rearward swiveling movement and tending to restore said arm means to a positively defined, radially extending position when said arm means is displaced therefrom.

11. An apparatus as described in claim 10 wherein said article engaging means includes:

extendable and retractable article grippers;

fluid means for extending said article gripping means; and means for introducing pressurized gas into the interior of an engaged article to support the periphery of the article during printing.

12. An apparatus as described in claim 10 including:

vertically extending, geared rack means extending downwardly from said first, screen printing means;

and pinion gear means carried by each of said arm means, said pinion gear means, when rotated, being adapted to rotate said article engaging means;

said pinion gear means being adapted to be moved into engagement with said geared rack means at the conclusion of the printing of articles by said first, screen printing means such that, when said turret means is vertically separated from said indicia forming means, said pinion gear means is rotated to rotate articles supported by said article engaging means.

13. An apparatus as described in claim 12 and including means for preventing rotation of said article engaging means during article printing by said first screen printing means.

References Cited by the Examiner
UNITED STATES PATENTS

| | | | |
|---|---|---|---|
| 287,634 | 10/83 | Croft | 74—129 |
| 1,870,825 | 8/32 | Sprague | 101—426 |
| 1,906,512 | 5/33 | Barrett | 101—426 |
| 2,142,158 | 1/39 | Sloan | 101—124 |
| 2,156,811 | 5/39 | Goodwin et al. | 101—40 X |
| 2,231,553 | 2/41 | Soubier | 101—124 |
| 2,644,594 | 7/53 | Komuchar et al. | 74—129 X |
| 2,690,118 | 9/54 | Schwartz et al. | 101—115 |
| 2,846,047 | 8/58 | Neighbour et al. | 74—129 |
| 2,971,629 | 2/61 | Black | 101—126 X |
| 2,987,992 | 6/61 | Velonis | 101—126 X |
| 3,096,709 | 7/63 | Eldred et al. | 101—126 X |

WILLIAM B. PENN, *Primary Examiner.*

ROBERT A. LEIGHEY, *Examiner.*